Aug. 4, 1964  J. W. BOOKER  3,142,939
CRAB SHELL CLEANING MACHINE
Filed Jan. 14, 1963  3 Sheets-Sheet 2
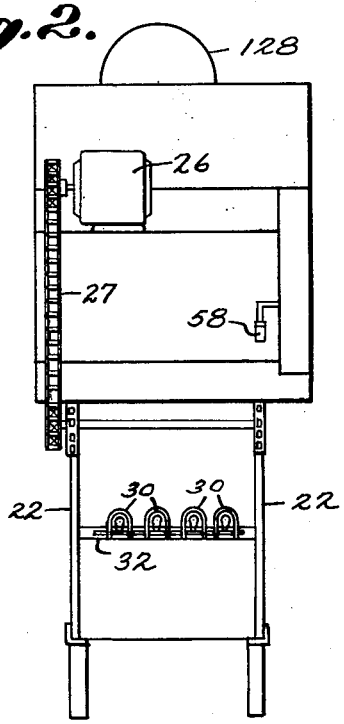
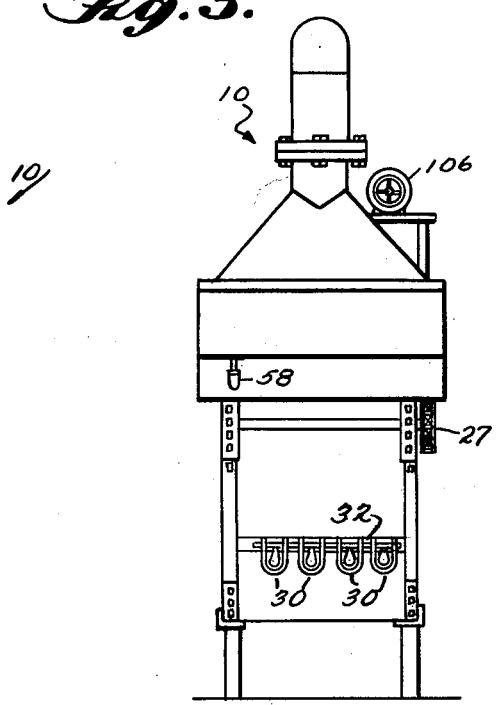
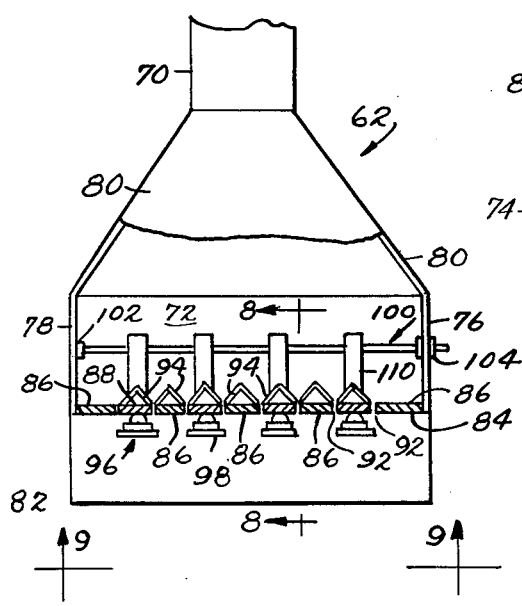
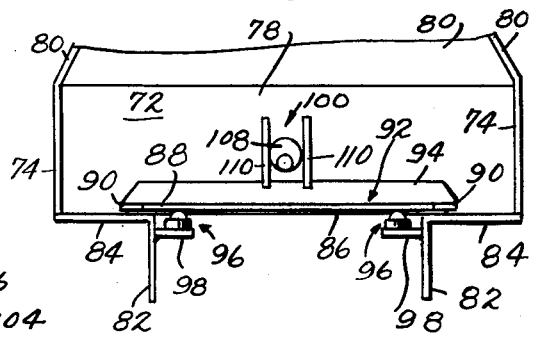
INVENTOR
JAMES W. BOOKER
BY Cushman, Darby & Cushman
ATTORNEYS Aug. 4, 1964  J. W. BOOKER  3,142,939
CRAB SHELL CLEANING MACHINE
Filed Jan. 14, 1963  3 Sheets-Sheet 3

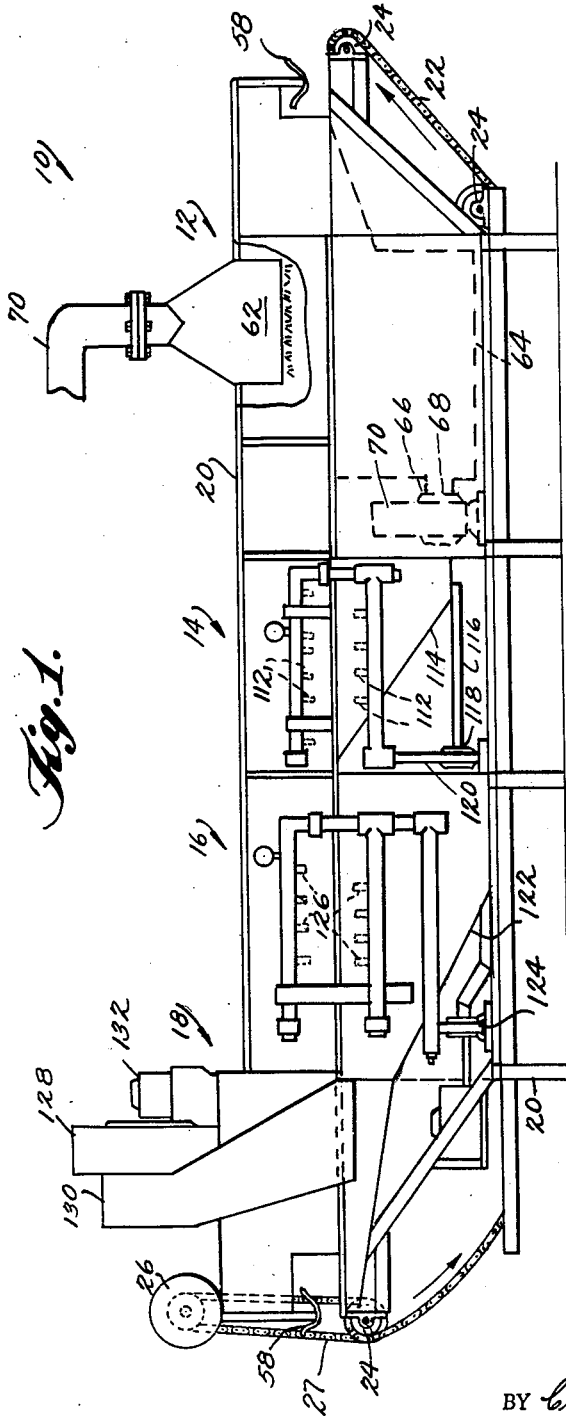

INVENTOR.
JAMES W. BOOKER
BY
Cushman, Darby & Cushman
ATTORNEYS

United States Patent Office 3,142,939
Patented Aug. 4, 1964

3,142,939
CRAB SHELL CLEANING MACHINE
James W. Booker, 807 Strangi Ave., Biloxi, Miss.
Filed Jan. 14, 1963, Ser. No. 251,333
7 Claims. (Cl. 51—14)

This invention relates to a machine for cleaning crab shells and in particular to a machine which passes the shells into contact with a stream of liquid abrasive composition while effectively supporting the shells against breakage by the action of the stream.

There is a demand for clean, sterilized crab shells for use in serving various crab dishes in restaurants and in displaying and selling crab meat in markets. The crab shells enhance the appearance of the food product and thus increase the sales appeal of the items. Crab shells to be used for this purpose must be completely free of shreds of meat and internal organs very soon after the initial removal of the meat. Any shreds of organic material remaining in the shell will decompose rapidly and in doing so cause decomposition of the shell to the extent that it becomes too weak to withstand cleaning or use as a food container. In addition, of course, any organic matter remaining in a shell renders that shell completely unsuitable for use as a food container.

The inherently weak and fragile nature of crab shells presents a problem in attempting to clean them thoroughly. Ordinary cleaning methods which involve the use of sprays or jets to loosen the fragments of organic matter from the shell mechanically or the use of cleaning solutions to remove the fragments by chemical action have not been found to be satisfactory. The conventional jet cleaning processes tend to break the shell and the chemical cleaning solutions tend to attack the shell as well as the organic matter and thereby so weaken the shell as to render it too fragile for further use.

It is a primary object of the present invention to provide a cleaning apparatus for crab shells which renders them suitable as decorative items by effectively removing all organic matter from the shells without breaking or weakening them.

It is a further object of the invention to provide a crab shell cleaning apparatus which transports the shells through one or more abrasive cleaning sprays while effectively supporting the shells against breakage by the action of the sprays.

It is a further object of the invention to provide a crab shell cleaning apparatus with a spraying device which is capable of effectively spraying an abrasive-containing liquid at high flow rates.

These and other objects and advantages will become apparent from the following description and the drawings in which:

FIGURE 1 is a side elevational view of a crab shell cleaning machine embodying the principles of the present invention;

FIGURE 2 is a rear end elevational view of the machine;

FIGURE 3 is a front end elevational view of the machine;

FIGURE 4 is a fragmentary top plan view of the crab shell retaining mechanism;

FIGURE 7 is a fragmentary side elevational view, partly in section, of the spraying device;

FIGURE 8 is a sectional view taken on the line 8—8 of FIGURE 7; and

Figure 9:
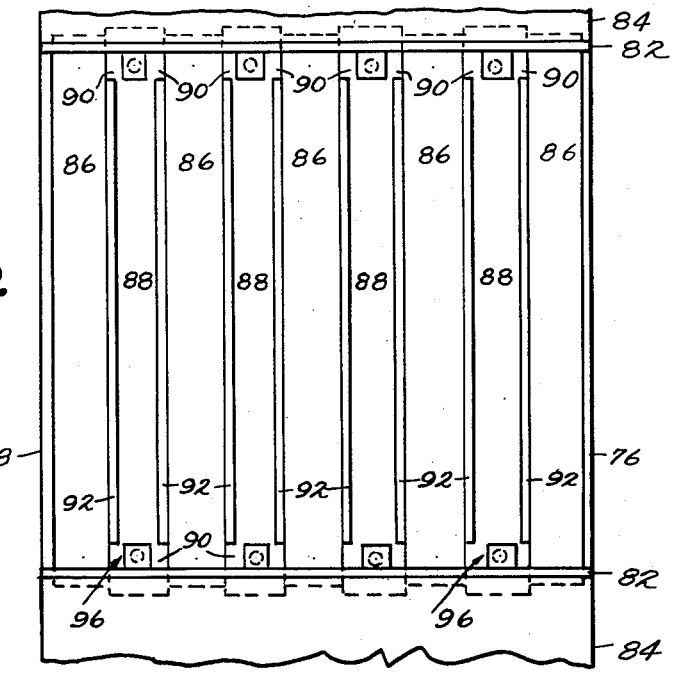
FIGURE 9 is a bottom plan view of the device of FIGURE 7 looking in the direction of the arrows 9—9.

Referring to FIGURES 1–3 there is shown therein a crab shell cleaning machine 10 including an abrasive spraying station 12, a rinsing station 14, a sterilizing station 16 and a drying station 18, all of which are mounted in horizontal sequence within a suitable floor-engaging frame 20. A short distance below the stations is mounted an endless conveyor which includes a pair of horizontally spaced chains 22 which are looped over suitable sprocket wheels 24 mounted on the frame 20 for rotation about horizontal axes extending transversely of the frame 20. A suitable drive motor 26 for the conveyor chains 22 is secured to one end of the frame 20 and is provided with conventional gearing and a drive chain 27 (not shown) for operating the conveyor in a direction to move its upper surface along a path from the spraying station 12 toward the drying station 18.

According to one feature of the invention the means for supporting the crab shells against breakage by the sprays includes opposed clamping elements which engage opposite sides of the shells in such a manner that the shells are not easily broken and in such a manner that the cavity of the shells is not obstructed. This is accomplished by providing supports for the back of the crab shell at locations near each end thereof and by clamping the shell against the supports with a retaining member which engages the opposite, or inner surface of the crab shell.

Figures 5, 6:
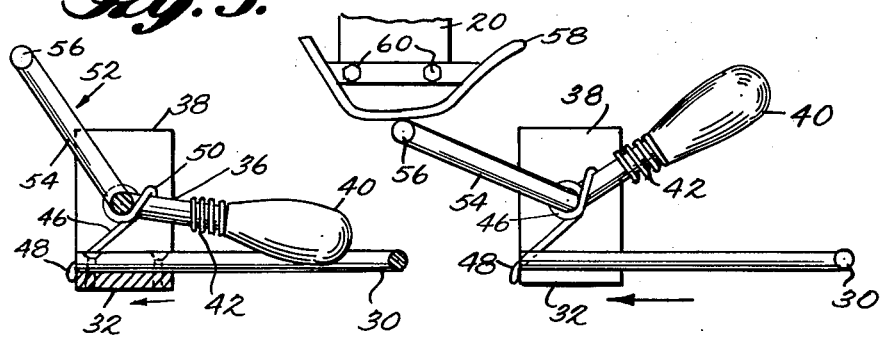
FIGURE 5 is an end elevational view, partly in section, looking from the left of FIGURE 4.
FIGURE 6 is a view similar to FIGURE 5 showing the retainer in an open position.

As seen in FIGURES 4–6, the support for the back of each crab shell includes two parallel elongated members 28 which are spaced apart a distance somewhat less than the end-to-end dimension of the shell. Conveniently, the pair of support members for each shell may be constructed of a single round metal rod 30 which is bent into the shape of a U. The ends of each U-shaped support 30 are secured in any suitable manner to an elongated support bar 32 which is of sufficient length to carry several spaced supports 30. The ends of the bar 32 are secured to the conveyor chains 22 transversely thereof and, in practice, a number of such bars will be longitudinally spaced along the conveyor. For simplicity only, one bar 32 is shown in FIGURES 2 and 3.

The means for retaining the shells in engagement with their respective U-shaped supports 30 includes a shaft 34 extending parallel to the support bar and having a plurality of relatively short studs 36 extending therefrom at right angles. The shaft 34 is mounted in spaced relation to the support bar as by a plurality of spaced brackets 38 which are secured to the bar in any suitable manner, and the studs 36 are located on the shaft 34 in positions such that one stud 36 is adjacent each U-shaped support 30. At the outer end of each stud 36 is a shell-retaining tip 40 constructed of relatively soft material such as rubber which is flexibly connected to the stud 36 by means of a relatively stiff coil spring 42. As shown, the tip 40 is generally cylindrical with a rounded outer end and a tapered inner end to which is fixed an axially extending stud 43. One end of the spring 42 is forced over the stud 43 and the other end is forced over the end of the stud 36 which may be of reduced diameter. It will be understood that the shape of the tip 40 and manner of flexibly mounting it with respect to the shaft 32 may vary from the particular constructions shown. The combined length of a stud 36 and its tip 40 is such that upon rotation of the shaft 34 the tip 40 may be positioned substantially midway between the legs of its associated support 30 so as to hold a crab shell 44 in contact with the support.

The shaft 34 is biased toward a shell-retaining position by means of one or more torsion coil springs 46 wrapped around the shaft. One end 48 of each spring engages the support bar 32 and the other end 50 engages a stud 36 so that leverage is applied to the shaft 34 in a clockwise direction as seen in FIGURES 5 and 6.

The shaft 34 is also provided with means for rotating the same against the action of the springs 46 so that the crab shells 44 may be inserted into and released from the supports 30. As shown in FIGURES 4–6 one end of the shaft terminates in a crank arm 52 which extends laterally beyond the end of the support bar 32 for engagement with a fixed actuating member secured to the frame of the machine near each end thereof. The crank arm 52 consists of a first portion 54 disposed in a vertical plane and extending upwardly and rearwardly and a second portion 56 disposed in a horizontal plane and extending laterally from the first portion 54. Each of the actuating members may be in the form of a fixed cam 58 or rail secured to the frame 20 as by bolts 60. FIGURE 5 illustrates the normal, shell-retaining position of the crank arm 58 and shell-retaining tip 40 within the machine 10 and FIGURE 6 illustrates the position of these elements in the open position effected by engagement of the arm 56 with one of the cams 58.

According to another feature of the invention an abrasive mixture of mud and finely divided walnut shells is sprayed into contact with the crab shells by means of a spray unit which agitates the abrasive mixture to maintain it homogeneous and which ejects the mixture through a plurality of elongated narrow slots. As seen in FIGURES 1 and 3, the spraying station 12 includes a spray unit 62 fixed to the frame 20 above the upper loop of the conveyor 22. Between the upper and lower loops of the conveyor 22 is an open-topped tank 64 which receives the abrasive mixture after it has performed its cleaning action on the crab shells 44. A pipe 66 leads from the bottom of the tank 64 to the inlet of a pump 68, preferably a centrifugal pump, and another pipe 70 leads from the pump outlet to the top of the spray unit 62. A suitable electric motor (not shown) is provided for operating the pump 68.

As seen in FIGURES 7 and 8, the spray unit 62 is a box-like structure defining a chamber 72 from which a liquid abrasive composition is sprayed downwardly. The side walls 74, front wall 76 and rear wall 78 of the chamber 72 have converging upper portions 80 which are sealed to the end of the pipe 70. The bottom wall is defined by the spray mechanism and by parallel spaced angle irons, each having one leg 82 extending downwardly and the other leg 84 extending laterally.

The spray mechanism includes a plurality of horizontal plates which are supported by the legs 82, 84 in a position transverse of the machine 10 and which define between them a plurality of narrow slots from which the abrasive composition is ejected. As shown in FIGURES 7–9 five rectangular spaced plates 86 extend transversely of the legs 84 and are secured to the upper surface thereof in any convenient manner, the forward plate 86 being sealed to the front wall 76 of the spray unit 62 and the rear plate 86 being sealed to the rear wall 78. Four transversely movable plates 88 having forwardly and rearwardly extending shoulders 90 at each end are fitted into the spaces between the fixed plates 86, the shoulders 90 engaging the plates 86 so as to maintain the alignment of the movable plates 88. The cut-away portions between the shoulders 90 at opposite ends of each plate 88 define, with the adjacent edges of the fixed plates 86, eight narrow spray slots 92. In practice the slots 92 will be very narrow, for example 0.03 inch, but for the purposes of illustration they are shown in the drawings as being of relatively great width.

Each of the plates 86 and 88, with the exception of the forward and rear fixed plates 86, has secured to its upper surface an elongated V-shaped member 94, such as a length of angle iron or the like which serves as a guide for directing the abrasive into the slots 92. The plates 88 and their associated members 94 also serve as agitators to assure that the components of the abrasive mixture do not separate.

The movable plates 86 are slidably supported from below on suitable bearings 96 which are secured to the vertical legs 82 by means of brackets 98. The bearings are so positioned that a slight clearance, for example 0.005 inch, between the ends of the plates 86 and the horizontal legs 84 is maintained. This arrangement reduces friction between the plates 86 and the legs 84 and assures that the plates will be readily slidable. For purposes of illustration in FIGURE 8 the clearance is shown much greater than is actually the case.

The arrangement for reciprocating the movable plates 88 includes a cam shaft 100 extending longitudinally through the chamber 72 above the plates 88. The rear end of the shaft 100 is journalled inside the chamber on the rear wall 78 as at 102 and the forward end extends through a bearing and seal 104 in the front wall 76 for connection with a motor 106 mounted on the frame 20. Spaced along the cam shaft 100 within the chamber 72 are four eccentric cams 108 each of which cooperates with a pair of spaced upstanding plates 110. The lower ends of each pair of plates 110 are secured to the V-shaped members 94 associated with one of the movable plates 88 so that rotation of the shaft 100 causes the four plates 88 to reciprocate in a direction transverse to the machine 10.

Ordinarily no special steps need be taken to assure that the back of the crab shells 44, which face downwardly as the shells pass through the abrasive spray, are cleaned. If necessary or desired, however, apparatus for spraying the abrasive mixture upwardly against the backs of the shells 44 may be provided. Such apparatus may be in the form of a spray unit similar to the unit 62 or in the form of conventional spray nozzles.

Rearwardly of the abrasive spraying station 12 is the rinsing station 14 which consists essentially of an arrangement of water sprays for rinsing the abrasive mixture from the crab shells 44. As shown, a plurality of conventional spray nozzles 112 is arranged along the frame 20 above and below the upper loop of the conveyor 22 and are aimed so as to eject water onto both surfaces of the shells 44. An open-topped tank 114 is supported by the frame 20 below the lower nozzles 112 to receive the rinse water. A pipe 116 from the bottom of the tank 114 leads to the inlet of a pump 118 and another pipe 120 leads from the pump outlet to the nozzles 112 so that the rinse water may be recycled.

Rearwardly of the rinsing station 14 is the sterilizing station 16 which is essentially a duplicate of the rinsing station 14. A sterilizing solution such as a solution of chlorine gas in water is retained in a tank 122 and is transferred by a pump 124 through suitable pipes to a series of spray nozzles 126 supported by the frame 20.

The drying station 18 consists essentially of a blower 128 mounted above the upper loop of the conveyor belt, a hood 130 for directing the air from the blower downwardly past the upper loop and a suitable motor 132 for operating the blower 128.

The preferred abrasive mixture for cleaning the crab shells consists essentially of a refined mud or clay, such as baroco, and finely divided walnut shells dispersed in water to a viscosity of about 31 poises. The baroco acts as a carrier in which the walnut shells are suspended so that the latter may properly perform a mechanical securing action on the crab shells. If desired, the mixture may also contain a small amount of a gelling agent and a small amount of lye to improve its cleaning characteristics.

To place the machine 10 in operation the motor 26 is actuated to move the conveyor 22 continuously counterclockwise as viewed in FIGURE 1 and the pumps 68, 118 and 124 and the blower 128 are actuated to effect the sprays of abrasive liquid, rinse water and sterilizing solution and the blast of air for drying. The motor 106 is also actuated to effect rotation of the cam shaft 100 and oscillation of the movable spray plates 88 within the chamber 72. It has been found that a pressure of about 60 p.s.i. in the chamber 72 produces jets of the abrasive mixture which are particularly effective in their cleaning action.

As each crab shell support bar 32 is moved into the front of the machine by the conveyor 22 the crank arm 52 on the shaft 34 engages the fixed actuating rail 58 on the frame 20 and is rotated about 45° counter-clockwise. This movement of the shaft 34 causes the studs 36 to move upwardly away from the support members 30 so that the crab shell 44, its back facing downwardly, may be manually cradled on each support member 30. As the conveyor 22 continues to move into the machine 10 the crank arm 52 slides off the rail 58 so that the shaft 34, under the action of the springs 46, rotates clockwise to place the tips 40 in engagement with the inner or cavity sides of the shells 44. The shells 44 are thus firmly held against dislodgement by the various sprays and in addition are held in such a manner that the strong spray of abrasive liquid does not crack or break them. By virtue of the springs 42 between the studs 36 and the tips 40, each tip 40 adjusts automatically to the contour of each shell 44. In practice, it has been found that the torsion springs 42 should bias the tips 40 downwardly with a force of about three pounds.

After being conveyed through the sequence of liquid sprays and the draft of drying air the shells 44 are released from their supports 30 at the rear end of the machine 10 by engagement of the crank arm 52 with the other fixed rail 58. The shells 44 which are now dry, sterile and completely free of organic matter are then removed manually from the supports 30 and may be used as containers for food without further processing.

While a specific embodiment of a crab shell cleaning machine embodying the principles of the present invention has been described and illustrated it will be apparent that modifications thereto may be made without departing from the scope of the present invention. It is therefore not intended that the details described and illustrated be limiting except as they appear in the appended claims.

What is claimed is:

1. Apparatus for cleaning crab shells comprising: a pair of relatively thin, elongated support members spaced apart a distance which is somewhat less than the end-to-end length of a crab shell whereby a crab shell may be placed across said support members; means mounting said support members against relative movement; an elongated, crab shell retaining element; means mounting said retaining element for reciprocal movement between a position in which one end thereof lies substantially midway between said support members and a position in which said one end is spaced from the plane defined by said support members, whereby a crab shell may be held between said retaining element and said support members; and means for spraying a fluid abrasive composition into the space between said support members in a direction which is at an angle to the plane defined by said support members.

2. Apparatus as in claim 1 wherein said retaining element is pivoted for rotation about an axis which lies in a plane parallel to the plane defined by said support members.

3. Apparatus as in claim 1 wherein said retaining element includes a resilient tip member at the end nearest said support members and flexible means connecting said tip member to the remainder of said retaining element.

4. Apparatus for cleaning crab shells comprising: spray means for discharging a spray of cleaning composition; conveyor means movable across the path of the spray; a crab shell support bar carried by said conveyor means; a pair of relatively thin, elongated support members extending from said support bar, said support members being spaced apart a distance which is somewhat less than the end-to-end length of a crab shell whereby a crab shell may be placed across said support members; rod means extending parallel to said support bar and movable therewith by said conveyor means; means mounting said rod for rotation about its longitudinal axis; an elongated shell retaining element projecting from said rod, the outer extremity of said retaining element being movable upon rotation of said rod between a position substantially midway between said support members and a position spaced from the plane defined by said support members whereby a crab shell may be held between said retaining element and said support members.

5. Apparatus for abrasively cleaning the surface of an article by spraying an abrasive fluid into contact therewith comprising: releasable clamping means for holding and supporting the article against movement by the spray; means for moving said clamping means along a predetermined path; and spray means for ejecting a spray of abrasive cleaning composition across the predetermined path of said clamping means, said spray means including walls defining a chamber for the cleaning composition, the wall facing said predetermined path being provided with at least two parallel spaced slots; means within said chamber adjacent the edges of said slots for agitating the cleaning composition and for guiding the same into said slots; and pressurizing means associated with said chamber for pressurizing the cleaning composition therein.

6. Apparatus as in claim 5 wherein the wall defining said slots includes a plurality of coplanar panels having portions of their adjacent edges spaced apart to form said slots and wherein at least one of said panels is reciprocally movable in a direction parallel to said slots.

7. Apparatus as in claim 5 wherein said means for guiding the cleaning composition includes an elongated member between adjacent slots and parallel thereto and having an exterior surface which tapers from the adjacent edges of the slots toward the interior of said chamber.

References Cited in the file of this patent

UNITED STATES PATENTS

| | | |
|---|---|---|
| 2,073,184 | Schweitzer | Mar. 9, 1937 |
| 2,532,655 | Backer | Dec. 5, 1950 |
| 2,618,109 | Miller | Nov. 18, 1952 |
| 2,618,216 | Mulvany | Nov. 18, 1952 |
| 2,635,284 | Hunt | Apr. 21, 1953 |
| 3,056,236 | McMillin | Oct. 2, 1962 |
| 3,075,318 | Dilliard et al. | Jan. 29, 1963 |